UNITED STATES PATENT OFFICE.

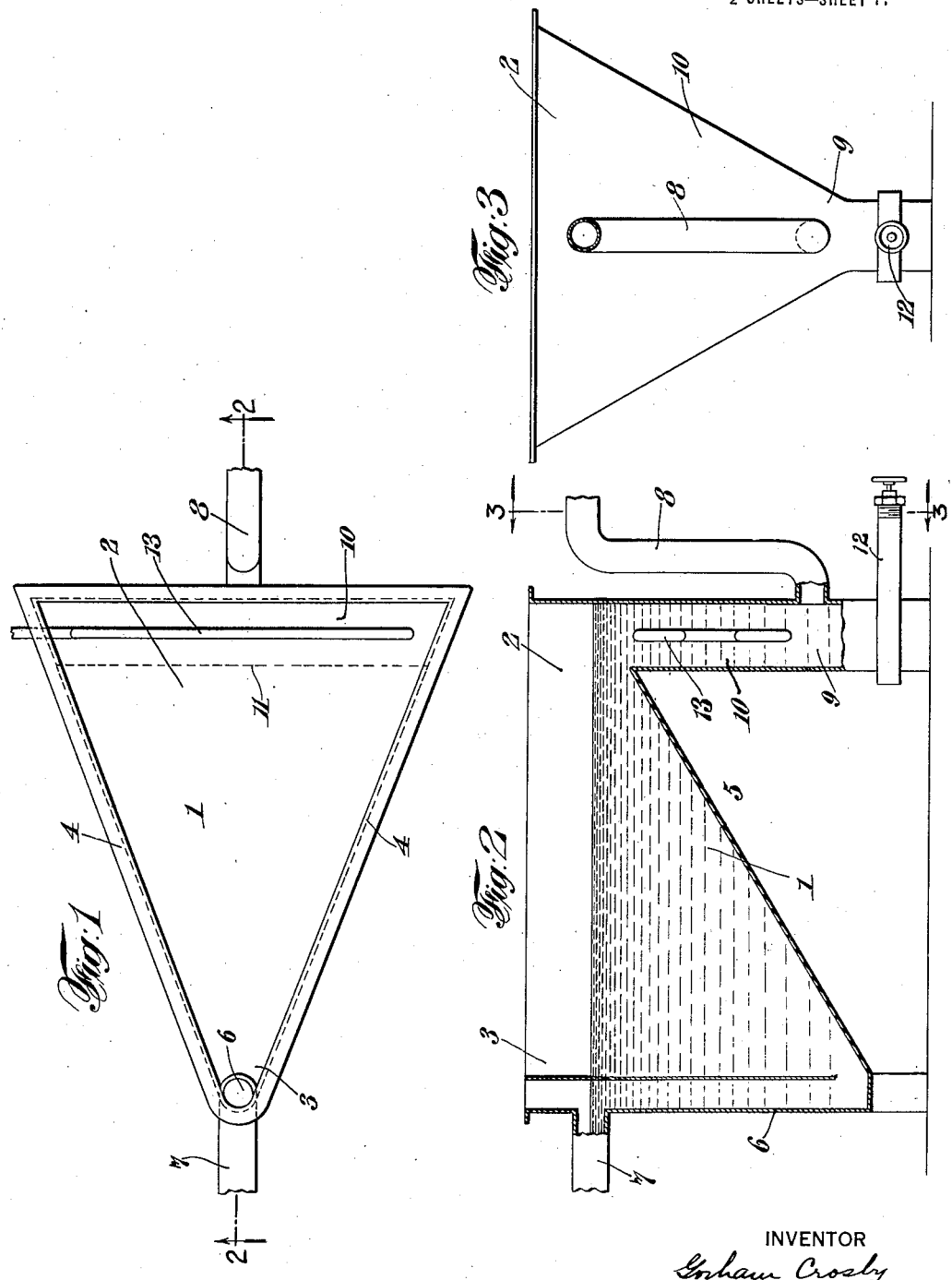

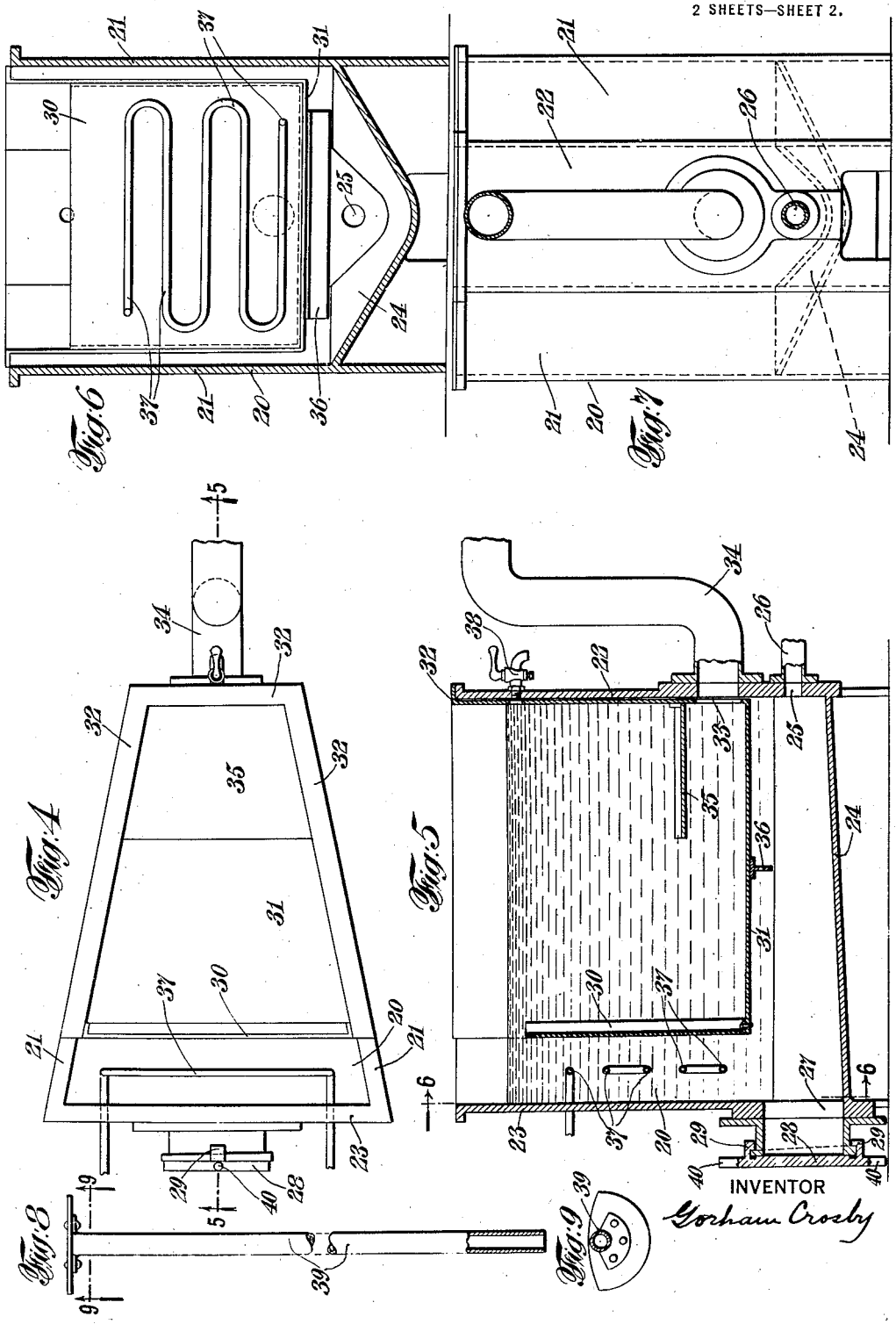

GORHAM CROSBY, OF GLEN RIDGE, NEW JERSEY, ASSIGNOR TO CHARLES BLUMENTHAL, OF NEW YORK, N. Y.

APPARATUS AND METHOD FOR SEPARATING MATTER FROM EFFLUENTS.

1,407,936.   Specification of Letters Patent.   Patented Feb. 28, 1922.

Application filed March 7, 1918, Serial No. 220,971. Renewed January 14, 1922. Serial No. 529,374.

*To all whom it may concern:*

Be it known that I, GORHAM CROSBY, a citizen of the United States, and a resident of Glen Ridge, in the county of Essex and State of New Jersey, have invented certain new and useful Improvements in Apparatus and Methods for Separating Matter from Effluents, of which the following is a specification.

The invention relates to a method and apparatus for separating matter from effluents and while useful for many kinds of effluents, it is particularly adapted to the separation of fatty matter from waste refuse liquids.

The main object of the invention is to provide a method and apparatus by means of which matter may be separated from effluents thoroughly and efficiently and which is relatively inexpensive to install. Further and more specific objects, features and advantages will more clearly appear from the detail description given below taken in connection with the accompanying drawings which form a part of this specification.

In the drawings Fig. 1 is a diagrammatic plan of an apparatus embodying certain of my improvements in their broader aspects; Fig. 2 is a sectional view of the same taken on the line 2—2 of Fig. 1; Fig. 3 is an end view of the same taken on the line 3—3 of Fig. 2; Fig. 4 is a plan view of an apparatus embodying my improvements more completely; Fig. 5 is a vertical section taken on the line 5—5 of Fig. 4; Fig. 6 is a vertical section taken on the line 6—6 of Fig. 5; Fig. 7 is an end view of the apparatus shown in Figs. 4, 5 and 6; Fig. 8 is a plan view of a hoe adapted to remove sediment from the apparatus; and Fig. 9 is a section of the same taken on the line 9—9 of Fig. 8.

Referring to Figs. 1, 2 and 3, 1 represents a suitable container one end 2 of which is relatively wide and the other end 3 of which is relatively narrow. It is provided with vertical side walls 4 converging toward one another toward the narrow end 3, and with a bottom 5 sloping downwardly from the wide end toward the narrow end of the container. At the narrow end an outlet pipe 6 extends vertically down into the chamber nearly to the bottom thereof, the pipe 6 being provided with a lateral branch 7 at the level of the liquid in the container and out through which the effluent flows, thus maintaining the level of the liquid in the container opposite said branch 7.

The effluent enters the apparatus through the pipe 8 and passes downwardly into the lower end 9 of a passageway 10 where any relatively heavy solid particles and sediment settle. The liquid containing floating matter rises through the passageway 10, the passageway being relatively long and narrow in horizontal cross section, so that the effluent moves upwardly relatively slowly therethrough as it approaches the relatively long narrow inlet to the container 1. When the effluent reaches the top 11 of the inclined bottom 5, it passes over into the floating matter separating chamber 1 at the wide end thereof. Thus the inlet to the floating matter separating chamber is relatively long and narrow so that the effluent passes into the floating matter separating chamber 1 relatively slowly and does not materially disturb the top relatively quiescent portion of liquid in the chamber 1, with the fat or other floating material floating on top thereof. In the relatively quiescent top portion of the effluent in the chamber 1 the fatty matter or other floating material separates from the heavier liquid which is drawn downwardly and off at the bottom through the pipe 6. After sufficient fat or other floating matter has been collected from the effluent on top of the body of liquid in the chamber 1, it is skimmed off or removed in any suitable manner. The lower end 9 of the passageway 10 is provided with an outlet normally closed by a valve 12. When it is desired to remove any sediment collected in the lower end of the passageway 10 the valve 12 is opened and the sediment will run out by gravity. In the upwardly extending inlet passageway 10 I have shown cooling pipes 13 for cooling the effluent to cause a more thorough separation of fatty matter therefrom.

Referring to Figures 4, 5, 6 and 7 I there show an outer container 20 provided with vertical side walls 21 converging toward a vertical relatively narrow end wall 22. At the other end the outer container is provided with a relatively wide vertical end wall 23. The outer container is provided with a sloping dished bottom 24 and with an inlet opening at 25 connecting with an inlet pipe 26 at the narrow end, and with a large opening 27 at the wide end, which large opening is normally closed by a cap 28 which is secured in place by bayonet joints 29.

Situated within the outer container is an inner chamber preferably formed of sheet metal, and the side walls of which closely fit the side walls of the outer container except that the wider end wall 30 of the inner container is spaced from the end wall 23 of the outer container so as to form an upwardly extending relatively long and narrow passageway in horizontal cross section, gradually increasing in cross section as it approaches the part where the effluents pass therefrom into the separating chamber. The flat bottom 31 of the inner chamber is arranged horizontally and spaced above the bottom 24 of the outer container so as to leave a passageway for the effluent entering through the inlet opening 25 and form a sediment separating and collecting chamber at the bottom of the outer container between the walls 23 and 30. The inner container is supported by flanges 32 thereon resting upon and secured to the upper edge of the outer container.

An outlet is provided in the inner container at 33 communicating with an outlet pipe 34 which extends upwardly to maintain the level of liquid in the containers at the upper end thereof. The end wall 30 is cut away somewhat below the top level of the liquid to provide a horizontally relatively long inlet along the wide end wall of the apparatus.

The effluent flows in through the inlet 25, heavy particles and sediment flowing down the inclined bottom toward the outlet 27. The liquid and floating matter then rises through the relatively wide passageway between the walls 23 and 30. As the cross section of this passageway is relatively large compared with the cross section at the inlet end adjacent the inlet 25 the liquid rises relatively slowly so that separation of the floating matter is commenced in this upwardly extending passageway. From this passageway the effluent flows through the relatively long and narrow inlet unobstructed over the top of the wall 30 into the inner chamber where the floating matter rises to the top and is thus separated therefrom. Since there are no baffle means in the passageway, inlet or adjacent part of the separating chamber or entrance thereto, the effluent flows horizontally into the main body in the separating chamber without causing whirls or eddys. The heavier liquid is drawn downwardly and off at the bottom well below the surface of liquid in the container and through the outlet at 33, a horizontal plate 35 being provided over the outlet and extending toward the center of the inner fat collecting chamber to cause the heavier liquid to be drawn downwardly toward the central bottom portion of the inner container. A baffle 36 may be provided which tends to direct the incoming effluent downwardly in the sediment collecting chamber. In the passageway between the walls 23 and 30 are arranged cooling pipes 37 to cool the effluent as it passes upwardly through the passageway and thus cause more thorough and efficient separation of the fatty matter in the fat separating chamber. A faucet is provided at 38 through which the fatty matter may be withdrawn at intervals.

For cleaning out the separated sediment from the bottom of the apparatus a hoe such as shown in Figures 8 and 9 may be used. The hoe is of semicircular shape as shown in Fig. 9 and is provided with a pipe handle 39. To remove the cap 28 the pipe 39 is slipped over projections 40 on the cap 28, and the pipe used as a lever to give the cap a quarter turn to unlock the bayonet joint and release the cap which may then be removed by hand. The hoe may then be inserted and the sediment scraped out therewith.

By reason of the deep and long or long passageway between the walls 23 and 30 through which the effluent flows relatively slowly as it approaches the inlet to the fat separating chamber, practically all sediment settles out in the passageway and does not enter the fat separating chamber, so that the body of liquid maintained in the inner or fat separating chamber is maintained relatively pure.

While I have described my improvements in great detail and in connection with certain specific embodiments thereof, I do not desire to be limited thereto since many changes and modifications may be made and the invention embodied in widely different forms without departing from the spirit and scope of the invention in its broader aspects. Hence, I desire to cover all forms coming within the language of any one or more of the appended claims.

What I claim and desire to secure by Letters Patent, is:

1. Apparatus of the class described comprising a chamber for separating floating matter from effluents, a chamber for separating sediment from the effluents, a passageway leading out of the sediment separating chamber and into the floating matter separating chamber, and means for cooling the effluent before it reaches the floating matter separating chamber, said passageway leading upwardly from the sediment separating chamber to said inlet.

2. Apparatus of the class described comprising a chamber for separating floating matter from effluents, a chamber for separating sediment from the effluents, a passageway leading out of the sediment separating chamber and into the floating matter separating chamber, and means for cooling the effluent located in said passageway, said passageway being relatively wide where it approaches the inlet to said floating matter separating chamber.

3. Apparatus for separating floating matter from effluents comprising a separating chamber relatively wide at one end and relatively narrow at the other end, the wall at the wide end being cut away below the level of the liquid in the chamber to form a relatively wide inlet and a relatively wide inlet passageway leading upwardly to said inlet, and means whereby sediment may be withdrawn at the bottom of said passageway, said passageway and inlet and the adjacent part of the separating chamber being substantially free of baffle means under which the effluent might flow to cause whirls of eddies.

4. Apparatus of the class described comprising a chamber for separating floating matter from effluents, a chamber for separating sediment from the effluents, a passageway leading out of the sediment separating chamber and into the floating matter separating chamber, and means for cooling the effluent located in said passageway, and means whereby sediment may be withdrawn at the bottom of said passageway.

5. The method of separating matter from effluents, which consists in maintaining a body of effluent the upper part of which is relatively quiescent, and introducing the effluent into said body adjacent the top thereof from a relatively wide upwardly flowing current of effluent flowing into the said body, and flowing horizontally without whirls or eddies into said body of effluent and collecting sediment from the effluent at the bottom of said upwardly flowing current.

Signed at New York in the county of New York and State of New York this 6th day of March A. D. 1918.

GORHAM CROSBY.